May 21, 1957 R. V. BURWEN 2,792,771
HEATING AND VENTILATING CONDUITS WITH SHUTTERS
Filed May 24, 1952
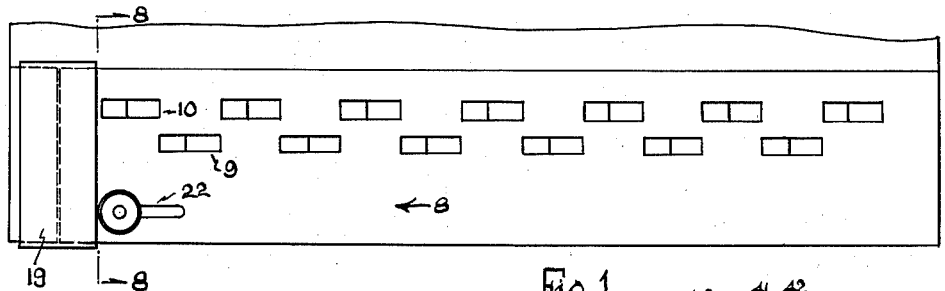
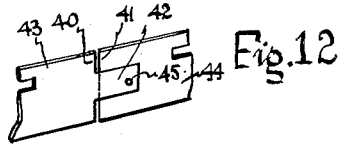
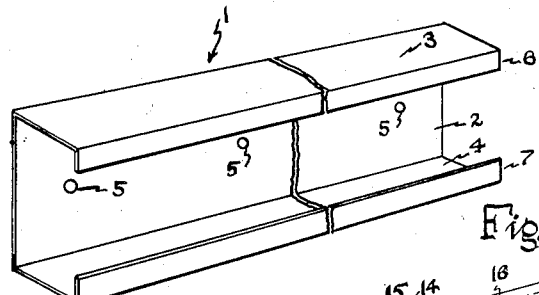
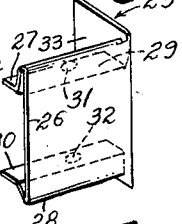
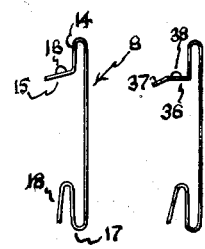
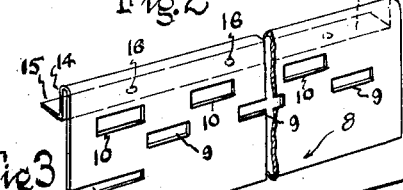
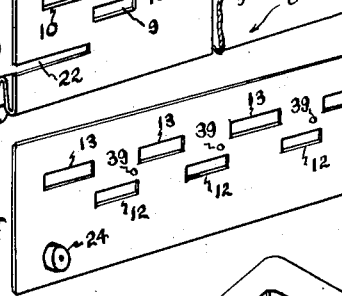
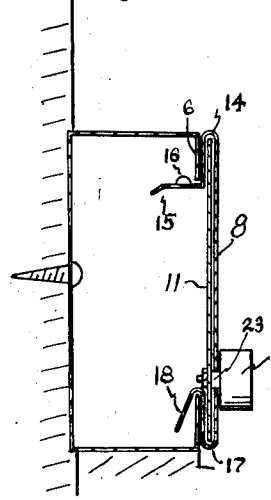
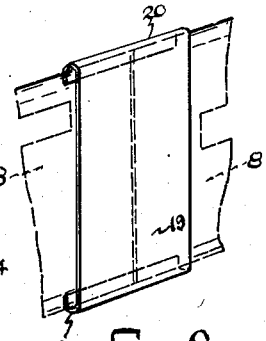
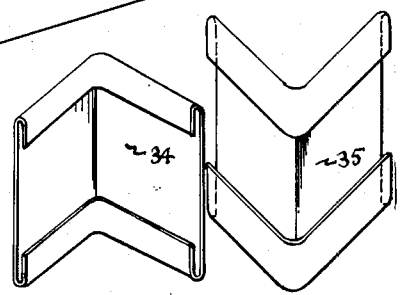
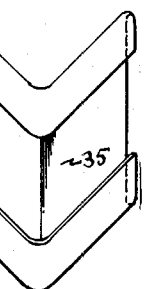
INVENTOR.
Robert V Burwen
BY
Ezekiel Wolf
his Attorney

United States Patent Office 2,792,771
Patented May 21, 1957

2,792,771

HEATING AND VENTILATING CONDUITS WITH SHUTTERS

Robert V. Burwen, Melrose, Mass.

Application May 24, 1952, Serial No. 289,739

8 Claims. (Cl. 98—40)

The present invention relates to a convection heating or cooling system, primarily with the use of air and more particularly to the construction and arrangement of the conduits and shutters or radiators which form a part of such a system.

While the invention may apply equally well to heating and to cooling or ventilating systems in offices, homes or other public buildings, it will be described more particularly in relation to heating or ventilating system for room or wall installation.

In accordance with the present invention, the hot or cooled air may be conveyed by pipes or other form of conduits to a base wall position where the heating or ventilating conduits of the present invention are installed.

The conduits of the present invention are preferably installed as a base-board, though they may be installed in other positions in relation to the walls of the building and the hot or cooled air supplied to them may be fed to the conduits through the base, through the back wall or through the end of the conduit. In fact the preferable feed is a plurality of conductors entering the conduit at spaced positions, so that the flow may be maintained in the conduit equally at all points. The conduit is preferably put together in definite sections of standard lengths of 8 feet and other lesser lengths. The conduit comprises essentially a back channel which forms three sides of the conduit and a forward plate which closes the front of the conduit, which plate together with a slide, forms the front shutter.

In place of a front shutter formed with the front closing piece and the slide, a front closing wall of a single element may be used.

The present invention also contemplates the use of end caps, spliced joints, inner and outer corners, so that a complete system can be installed readily in any type of building with a standard set of elements of a minimum number available for substantially all kinds of installations.

A further improvement in the present invention is obtained in the installation of the conduit with the shutter at the base of the walls whereby the hot air in a heating system is forced out or flows out about ankle high along the walls, and from there rises to neutralize the cooled wall surface and also to heat the air of the room.

A further important feature in the present invention is that parts may readily be disassembled for cleaning and further that a simple and easy arrangement is provided for opening and shutting the conduit so as to permit the desired amount of warm or cooled air to flow into the room.

The present invention finds great usefulness in its installation on the base-board or as the base-board and takes up very little space in the walls, while providing a heating or cooling unit in the most favorable and economical position.

Other and further advantages of the present invention will be more readily appreciated from the description in the specification set forth below when taken in connection with the drawings illustrating an embodiment of the same, in which:

Figure 1 shows the present invention in elevation as applied to the base-board of a wall.

Figure 2 shows a detail in perspective of one element of the present invention comprising a channel member.

Figure 3 shows in perspective a view of the front wall of the conduit or ventilator of the present invention.

Figure 4 shows a perspective view of the shutter or slide used in connection with the front wall.

Figure 5 shows a side elevation of the front wall of Figure 3.

Figure 6 shows a modification of the arrangement of Figure 5.

Figure 7 shows a perspective view of the end wall construction of the conduit.

Figure 8 shows a section taken on the line 8—8 of Figure 1.

Figure 9 shows a spliced joint for the front wall of the conduit.

Figures 10 and 11 show outside and inside corners for splicing the front walls at the corners of the room, and, Figure 12 shows a detail of joining the shutters together.

In the arrangement indicated in the figures, an elongated channel member (Figure 2) which has a back wall 2, a top wall 3 and a bottom wall 4 forming the walls of the conduit may be attached to the base-board by nailing or by applying screws through the back wall 2. The holes for the application of screws are shown at 5, 5, 5, in the back wall 2, but if nails are used the nails may be hammered through the sheet metal of the back wall. The top and bottom walls 3 and 4 respectively have downwardly and upwardly extending flanges 6 and 7 respectively which are preferably aligned in the same plane. In installation the channel member is first nailed to the wall and then other elements attached to it. These other elements comprise a front wall member 8 which may have a series of ports 9, 9, 9, etc., and 10, 10, 10, etc., aligned in rows and spaced equal distances in staggered arrangement so that in a vertical line, that is a line perpendicular to the rows, there is no opening except in the port in one row. The shutter element 11 with correspondingly spaced ports 12, 12, 12, in one row and 13, 13, 13, in the other row fits in face to face relation on the inner side of the front wall 8 so that in one position the posts may be fully opened while in a second position of the shutter the ports may be fully closed. In the intermediate position, each port has a part area which is open. This will be described further, later in the specification.

The front plate or wall 8 is provided with a reversely turned side edge 14 on the top preferably formed as a turned in flange of the front plate parallel to the wall of the front plate which continues with an inwardly extending flange 15. The inwardly extending flange 15 is provided with a plurality of upwardly projecting bosses 16, 16, shown more clearly in Figure 8, which bosses when the front wall lies in its proper position come in contact with the flange 6 extending downwardly from the top wall 3 of the channel. At the lower side of the wall 8 there is an upwardly extending reverse flange 17 which is substantially parallel to the downwardly extending flange 14. The flange 17 runs all along the lower edge of the wall 8 while the flange 14 runs all along the upper edge of the wall 8. The flange 17 terminates in a reverse bend or section 18 extending downward. The flange 17 lies against the forward face of the flange 7 extending upward from the bottom wall 4 and the flange 18 extends over the back face of the flange 7. From this it will be seen that the wall 8 is slidable along the two flanges 6 and 7 of the channel 1 to provide the front wall of the conduit. At the same time it will be noted that the flanges 14 and 17 both stand forwardly from the flanges 6 and 7 and provide sufficient leeway or space to receive a splice plate such as the splice plate 19, Figure 9, which fastens over the flanges 14 and 17. This is indicated in Figure 1 at the left of the figure. For this purpose the splice plate 19 is provided at the top and bottom edge with curved gripping flanges 20 and 21 which fit respectively over the flanges 14 and 17 and make a good, tight connection between one front wall 8 and the next front wall 8 when the conduit is extended for a length along the wall.

It should be noted that in this connection the front wall may be fully closed without ports for the exit of the ventilating air.

The slide 11 fits in between the opposed faces of the flanges 14 and 17. Further the face wall 8 when used as a port wall is provided with a slot 22 extending inward from one end of the front wall parallel to the side edges. This slot is positioned to receive a pin or stud 23 at the forward end of which there is provided a handle or knob 24. The knob 24 lies forward of the face of the wall 8 while the stud 23 has such a fit that it may slide the length of the slot 22. When the wall 8 is fixed in position in the conduit and the slide is also in place, the open end of the slot 22 is covered over by the plate 19 as indicated in Figure 1 and this limits therefore the motion of the slide or shutter, to the left as indicated in Figure 1, while the end of the slide 22 limits the motion of the slide or shutter in the other direction. The ends of the conduit are fitted with caps 25, which are partly held in place by means of the splice plate 19. For this purpose the front wall 8 is made shorter by a small distance, say 2" or 1½" than the channel 1, or if desired, the walls may be the same but the front wall may be displaced to the left or the right into the next channel. In either case where the conduit is to be terminated at one end, a space of approximately 1½" or 2" is left open on the front wall and against this is set the end section 25 of the face section 26 lying as a continuation of the front wall 8. In this case the turned in flanges 27 and 28 will approximately be a continuation of the flanges 14 and 17 and the inwardly extending flanges 29 and 30 will approximately be a continuation of the flanges 15 and 18. The end piece 25 is also provided with bosses 31 and 32 so that they will hook the inside flanges 6 and 7 of the channel member. The front face 26 of the end piece 25 is slid in position to bring the end plate element 33 up against the end of the conduit, closing that end of the conduit. When this end plate is in this position, then the splice plate 19 is put in position and this holds tightly all of the elements together. It is of course necessary at times to take the conduit around a corner. For this purpose, two channel members may be mitered together at a right angle junction and a front plate angle splice 34 or 35 may be used dependent upon whether the face plate projects outward or inward. Where the angle is an inward angle, the angle plate 35 of Figure 11 is to be used and where the angle is an outward angle, the angle plate 34 of Figure 10 is to be used.

The particularly form of construction of the flange attached to the front plate may be varied. Such variation should however make it possible for splicing the front plate along its length. A slight variation of the construction of the flange relations of the front plate is shown in Figure 6 where the inwardly extending flange may be provided with a section 36 projecting at right angles to the plane of the face of the wall with a terminating tip 37 extending slightly downward. This construction, particularly with a boss 38 in the horizontal section 36 tends to keep the front wall in a position with less tolerance than in other constructions, particularly after the installation has been made.

In order to make the shutter slidable more freely with respect to the back wall, the shutter is provided with a series of pin point bosses 39, regularly spaced and projecting outward from the shutter against the front wall 8. These pin point bosses give rounded sliding surfaces for the shutter against the front wall and permit easy operation of the shutters particularly where two or three may be linked together along one whole side of the room. The linking of the shutters together is shown in Figure 12. The shutter ends 40 and 41 abut one another with another with an over-lapping central tongue member 42, offsetting slightly the thickness of the shutter and overlapping in face to face relation the adjacent shutter elements, such as indicated by the two shutters 43 and 44. A single rivet or pin 45, pins the two shutters together in such a way, however as to permit slight turning so that absolute alignment of the shutters is not necessary. Each shutter of course will be guided by its front wall and also in the groove formed by the flanges as well as by the slot 22 so that the operation may be made very smoothly.

Having now described my invention, I claim:

1. Conduit construction for heating and ventilating systems, comprising a channel member forming the back wall, top wall and bottom wall of the conduit, said top and bottom walls having downwardly and upwardly projecting flanges respectively at their forward ends, a front wall having inwardly projecting flanges running lengthwise of the front wall on the inside at a height to engage the edges of said first mentioned flanges, means associated with one of said inwardly extending flanges for holding the front wall in place, an end cap for said conduit including an angle member having one wall covering the end of the conduit and a second wall forming an extension of said front wall and a splice plate covering one end of the said front wall and said extension and having flanges at each side extending over the side edges of the front wall and said extension.

2. Conduit construction for heating and ventilating systems, comprising a channel member forming the back wall, top wall and bottom wall of the conduit, said top and bottom walls having downwardly and upwardly projecting flanges respectively, at their forward ends, a front wall having reversely turned side edges forming grooves and terminating in inwardly extending flanges, said reversely turned side edges lying against said first mentioned flanges with said inwardly extending flanges adjacent the edge of said first mentioned flanges, means associated with one of said inwardly extending flanges for holding the front wall flush against said first mentioned flanges, said front wall having a plurality of positioned ports and a shutter member with similarly positioned ports said shutter member positioned to slide in the grooves formed by said reversely turned side edges.

3. Conduit construction for heating and ventilating systems, comprising a channel member forming the back wall, top wall and bottom wall of the conduit, said top and bottom walls having downwardly and upwardly projecting flanges respectively, at their forward ends, a front wall having reversely turned side edges forming grooves and terminating in inwardly extending flanges, said reversely turned side edges lying against said first mentioned flanges with said inwardly extending flanges adjacent the edge of said first mentioned flanges, means associated with one of said inwardly extending flanges for holding the front wall flush against said first mentioned flanges, said front wall having a plurality of positioned ports and a shutter member with similarly positioned ports said shutter member positioned to slide in the grooves formed by said reversely turned side edges, and a handle having a pin extension passing through a slot in said front wall and fixed to said shutter for providing limited motion to said shutter.

4. Conduit construction for heating and ventilating systems, comprising a channel member forming the back wall, top wall and bottom wall of the conduit, said top and bottom walls having downwardly and upwardly projecting flanges respectively, at their forward ends, a front wall having reversely turned side edges terminating in inwardly extending flanges, said reversely turned side edges lying against said first mentioned flanges with said inwardly extending flanges adjacent the edge of said first mentioned flanges, means associated with one of said inwardly extending flanges for holding the front wall flush against said first mentioned flanges, said front wall having a plurality of positioned ports and a shutter member with similarly positioned ports positioned to slide in the groove formed by said reversely turned side edges, a handle having a pin extension passing through a slot in said front wall and fixed to said shutter for providing limited motion to said shutter, an end cap for said conduit having a wall covering the end of the conduit and a wall coextensive with the front wall and forming a continuation thereof and a splice plate covering the joint of the front wall and section coextensive therewith and partly covering said slot.

5. Conduit construction for heating and ventilating systems, comprising a channel member forming the back wall, top wall and bottom wall of the conduit, said top and bottom walls having downwardly and upwardly projecting flanges respectively at their forward ends, a front wall having reversely turned side edges forming grooves and terminating in inwardly extending flanges, said reversely turned side edges lying against said first mentioned flanges with said inwardly extending flanges adjacent the edge of said first mentioned flanges, means associated with one of said inwardly extending flanges for holding the front wall flush against said first mentioned flanges, said front wall having a plurality of positioned ports, a shutter member with similarly positioned ports, said shutter member positioned to slide in the grooves formed by said reversely turned side edges, said shutter member having on its front face a plurality of spaced bosses substantially not higher than the thickness of the shutter providing spaced points of contact with the rear face of said front wall.

6. A structure as set forth in claim 5 in which said shutter comprises two substantially aligned members pivotally joined together.

7. Conduit construction for heating and ventilating systems, comprising a channel member forming the back wall, top wall and bottom wall of the conduit, said top and bottom walls having downwardly and upwardly projecting flanges respectively at their forward ends, a front wall having inwardly projecting flanges running lengthwise of the front wall on the inside at a height to engage the edges of said first mentioned flanges, means associated with one of said inwardly extending flanges for holding the front wall in place, and an angle member formed with two joined plate elements, one covering the end of the conduit and the other having inwardly projecting flanges running lengthwise of the front wall on the inside at a height to engage the edges of said first mentioned flanges and aligned with said first mentioned flanges along adjacent side edges, and plate means covering said adjacent side edges.

8. Conduit construction for heating and ventilating systems, comprising a channel member forming the back wall, top wall and bottom wall of the conduit, said top and bottom walls having downwardly and upwardly projecting flanges respectively at their forward ends, a front wall having inwardly projecting flanges running lengthwise of the front wall on the inside at a height to engage the edges of said first mentioned flanges, means associated with one of said inwardly extending flanges for holding the front wall in place, and an angle member formed with two joined plate elements, one covering the end of the conduit and the other having inwardly projecting flanges running lengthwise of the front wall on the inside at a height to engage the edges of said first mentioned flanges and aligned with said first mentioned flanges.

References Cited in the file of this patent

UNITED STATES PATENTS

| 800,055 | Ayres | Sept. 19, 1905 |
| 1,488,090 | Buhr | Mar. 25, 1924 |
| 1,718,254 | Putnam | June 25, 1929 |
| 1,809,223 | Tashjian | June 9, 1931 |
| 1,942,137 | Connell et al. | Jan. 2, 1934 |
| 1,958,342 | Johnson | May 8, 1934 |
| 2,087,640 | Du Prey | July 20, 1937 |
| 2,515,255 | O'Brien et al. | July 18, 1950 |
| 2,519,503 | Rigaumont | Aug. 22, 1950 |
| 2,627,800 | Brandes | Feb. 10, 1953 |
| 2,662,747 | Trane et al. | Dec. 15, 1953 |

FOREIGN PATENTS

| 525,222 | Great Britain | Aug. 23, 1940 |